(12) United States Patent
Impola et al.

(10) Patent No.: US 11,543,522 B2
(45) Date of Patent: Jan. 3, 2023

(54) ULTRASONIC SENSORS FOR WORK MACHINE OBSTACLE DETECTION

(71) Applicant: Caterpillar Paving Products Inc., Brooklyn Park, MN (US)

(72) Inventors: Todd A. Impola, Minnetonka, MN (US); Timothy M. O'Donnell, Long Lake, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 449 days.

(21) Appl. No.: 16/845,915

(22) Filed: Apr. 10, 2020

(65) Prior Publication Data

US 2021/0318430 A1    Oct. 14, 2021

(51) Int. Cl.

| | |
|---|---|
| *G01S 15/931* | (2020.01) |
| *G01S 15/86* | (2020.01) |
| *G01S 13/86* | (2006.01) |
| *G01S 13/931* | (2020.01) |
| *E01C 19/26* | (2006.01) |

(Continued)

(52) U.S. Cl.
CPC ............ *G01S 15/931* (2013.01); *E01C 19/26* (2013.01); *E01C 21/00* (2013.01); *E02D 3/026* (2013.01); *G01S 13/862* (2013.01); *G01S 13/931* (2013.01); *G01S 15/86* (2020.01);
(Continued)

(58) Field of Classification Search
CPC ...... G01S 15/931; G01S 15/86; G01S 13/862; G01S 13/931; G01S 2013/93275; G01S 2015/938; E01C 19/26; E01C 21/00; E02D 3/026

See application file for complete search history.

(56) References Cited

U.S. PATENT DOCUMENTS

| | | |
|---|---|---|
| 4,403,220 A | 9/1983 | Donovan |
| 5,529,138 A | 6/1996 | Shaw et al. |

(Continued)

FOREIGN PATENT DOCUMENTS

| | | |
|---|---|---|
| CN | 206599718 | 10/2017 |
| CN | 207109515 | 3/2018 |

(Continued)

OTHER PUBLICATIONS

"U.S. Appl. No. 16/846,009, Non Final Office Action dated Jul. 2, 2021", 10 pgs.

(Continued)

*Primary Examiner* — Peter M Bythrow
(74) *Attorney, Agent, or Firm* — Schwegman, Lundberg & Woessner

(57) ABSTRACT

A work machine includes a frame, a sensor assembly, and an ultrasonic sensor. The frame includes a first portion and a second portion that includes a front bumper and is configured to pivot with respect to the first portion for steering the work machine. The sensor assembly is positioned on the first portion or the second portion of the frame and is configured to sense data for detection of obstacles within a first area around the work machine. The ultrasonic sensor is positioned on the front bumper of the second portion and is configured to sense data for detection of obstacles within a second area around the work machine, the second area outside the first area when the second portion is in an articulated position with respect to the first portion.

20 Claims, 3 Drawing Sheets

(51) Int. Cl.
*E02D 3/026* (2006.01)
*E01C 21/00* (2006.01)

(52) U.S. Cl.
CPC ............... *G01S 2013/93275* (2020.01); *G01S 2015/938* (2013.01)

(56) References Cited

U.S. PATENT DOCUMENTS

| | | | | |
|---|---|---|---|---|
| 5,719,713 | A * | 2/1998 | Brown | B60R 1/025 359/872 |
| 5,732,785 | A * | 3/1998 | Ran | B60R 19/205 180/274 |
| 5,734,336 | A * | 3/1998 | Smithline | G01S 15/931 250/236 |
| 6,268,803 | B1 * | 7/2001 | Gunderson | G08G 1/166 340/436 |
| 6,642,839 | B1 * | 11/2003 | Gunderson | G01S 13/931 340/904 |
| 6,690,413 | B1 * | 2/2004 | Moore | H04N 7/181 348/E7.086 |
| 7,061,372 | B2 | 6/2006 | Gunderson et al. | |
| 7,130,727 | B2 * | 10/2006 | Liu | B60R 1/025 359/872 |
| 8,427,288 | B2 * | 4/2013 | Schofield | B60S 1/0822 348/148 |
| 10,798,303 | B1 | 10/2020 | Camyre et al. | |
| 11,247,610 | B2 * | 2/2022 | Carpenter | B60R 1/003 |
| 2006/0287829 | A1 * | 12/2006 | Pashko-Paschenko | B60Q 9/005 340/436 |
| 2008/0263912 | A1 | 10/2008 | Gharsalli et al. | |
| 2012/0105638 | A1 | 5/2012 | Englander | |
| 2012/0154785 | A1 | 6/2012 | Gilliland et al. | |
| 2015/0210213 | A1 * | 7/2015 | Mitsuta | G01S 13/867 340/435 |
| 2015/0253427 | A1 | 9/2015 | Slichter et al. | |
| 2016/0054283 | A1 * | 2/2016 | Stromsoe | E01C 19/236 73/488 |
| 2016/0138247 | A1 * | 5/2016 | Conway | E02F 9/2033 701/50 |
| 2017/0010621 | A1 | 1/2017 | Rio et al. | |
| 2017/0118915 | A1 * | 5/2017 | Middelberg | A01D 69/03 |
| 2017/0120800 | A1 | 5/2017 | Liñan et al. | |
| 2018/0077851 | A1 * | 3/2018 | Hatton | A01B 76/00 |
| 2018/0170369 | A1 * | 6/2018 | Mitchell | B62D 1/02 |
| 2018/0319392 | A1 * | 11/2018 | Posselius | B60W 10/04 |
| 2018/0319396 | A1 * | 11/2018 | Foster | A01B 69/001 |
| 2019/0003137 | A1 | 1/2019 | Gao et al. | |
| 2019/0014723 | A1 * | 1/2019 | Stanhope | G06V 20/58 |
| 2019/0079532 | A1 | 3/2019 | Crawley | |
| 2019/0093299 | A1 | 3/2019 | Meixner | |
| 2019/0235504 | A1 * | 8/2019 | Carter | G06T 7/73 |
| 2019/0382005 | A1 * | 12/2019 | Nishi | A01B 69/001 |
| 2020/0113118 | A1 * | 4/2020 | Stanhope | A01B 69/007 |
| 2020/0132835 | A1 * | 4/2020 | Han | G01S 15/931 |
| 2020/0183008 | A1 * | 6/2020 | Chen | G01S 17/89 |
| 2020/0231210 | A1 * | 7/2020 | Anderson | H04N 5/2257 |
| 2020/0256775 | A1 | 8/2020 | White | |
| 2020/0346581 | A1 * | 11/2020 | Lawson | G06T 7/73 |
| 2021/0141080 | A1 | 5/2021 | Oetken et al. | |
| 2021/0240193 | A1 | 8/2021 | Endo et al. | |
| 2021/0350681 | A1 * | 11/2021 | Imaizumi | B60Q 9/008 |
| 2022/0050209 | A1 * | 2/2022 | Tsujimura | B60P 1/04 |

FOREIGN PATENT DOCUMENTS

| | | |
|---|---|---|
| CN | 109826074 | 5/2019 |
| DE | 102014209744 | 12/2015 |
| DE | 102014111098 | 2/2016 |
| DE | 102014014294 | 3/2016 |
| EP | 1508819 | 1/2008 |

OTHER PUBLICATIONS

"U.S. Appl. No. 16/846,009, Response filed Sep. 24, 2021 to Non Final Office Action dated Jul. 2, 2021", 17 pages.

"U.S. Appl. No. 16/846,009, Final Office Action dated Oct. 27, 2021", 20 pgs.

"U.S. Appl. No. 16/846,009, Response filed Jan. 26, 2022 to Final Office Action dated Oct. 27, 2021", 10 pgs.

"U.S. Appl. No. 16/846,009, Pre-Appeal Brief Request filed Jan. 26, 2022", 5 pgs.

"U.S. Appl. No. 16/846,009, Final Office Action dated Feb. 22, 2022", 23 pgs.

"U.S. Appl. No. 16/846,009, Decision on Pre-Appeal Brief Request mailed Feb. 9, 2022", 2 pgs.

"U.S. Appl. No. 16/846,009, Appeal Brief filed Jun. 13, 2022", 31 pgs.

* cited by examiner

ULTRASONIC SENSORS FOR WORK MACHINE OBSTACLE DETECTION

TECHNICAL FIELD

The present application relates generally to work machines. More particularly, the present application relates to object detection using ultrasonic sensors for work machines.

BACKGROUND

Work machines, such as compaction machines, can be used for compacting substrates. More particularly, after application of an asphalt layer on a ground surface, a compaction machine can be moved over the ground surface in order to achieve a planar ground surface. Compaction machines can be manual, autonomous, or semi-autonomous. To aid in control of the compaction machine, obstacle detection may be employed to detect obstacles with respect to the compaction machine. European Patent No. 1508819 B1 discloses a driving assistance system for an automobile that employs various types of sensors.

SUMMARY

In one example, a work machine includes a frame, a sensor assembly, and an ultrasonic sensor. The frame includes a first portion and a second portion that includes a front bumper and is configured to pivot with respect to the first portion for steering the work machine. The sensor assembly is positioned on the work machine and is configured to sense data for detection of obstacles within a first area around the work machine. The ultrasonic sensor is positioned on the front bumper of the second portion and is configured to sense data for detection of obstacles within a second area around the work machine, the second area outside the first area when the second portion is in an articulated position with respect to the first portion.

In another example, a method for detecting obstacles during operation of a work machine includes sensing, using a first sensor assembly positioned on the work machine, data for detection of obstacles within a first area around the work machine; steering the work machine in a first direction by pivoting a second portion of the frame with respect to the first portion of the work machine; and sensing, using an ultrasonic sensor positioned on a front bumper of the second portion of the frame, sense data for detection of obstacles within a second area around the work machine, the second area outside the first area when the second portion is in an articulated position with respect to the first portion.

In another example, a compactor includes first and second frame portions, a sensor assembly, and an ultrasonic sensor. The second frame portion includes a front bumper and is configured to articulate with respect to the first portion for steering the compactor. The sensor assembly is positioned on the first frame portion or the second frame portion and is configured to sense data for detection of obstacles within a first area around the compactor. The ultrasonic sensor is positioned on the front bumper of the second frame portion and configured to sense data for detection of obstacles within a second area around the compactor, the second area outside the first area when the second frame portion is in an articulated position with respect to the first frame portion.

DETAILED DESCRIPTION

Figure 1:
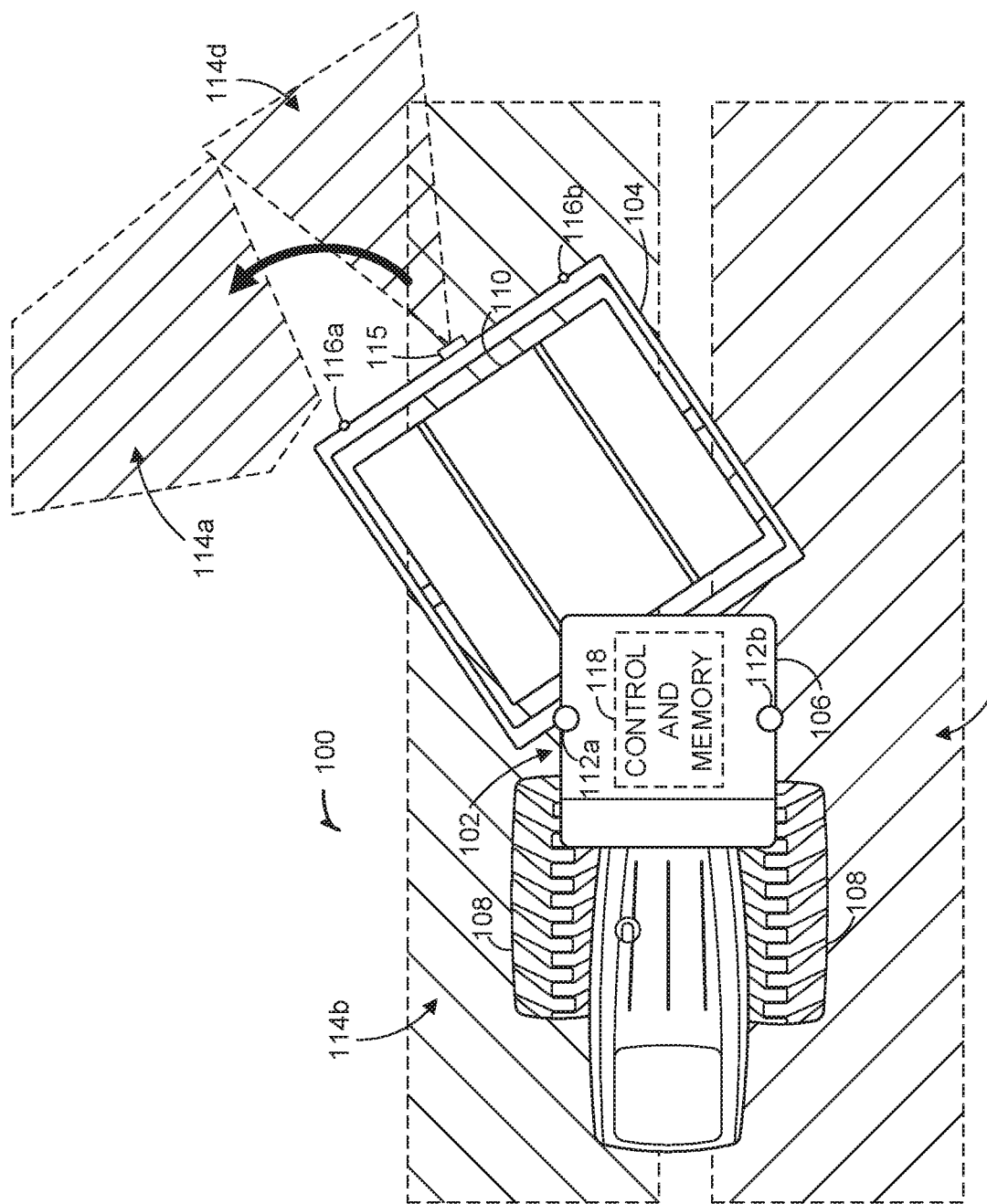
FIG. 1 is a diagram illustrating an articulated-type work machine that includes ultrasonic sensors for obstacle detection.

FIG. 1 is an overhead view illustrating an example compactor 100. While illustrated as a soil compactor, the systems and methods disclosed herein can be applied to any work machine including dozers, mixers, scrapers, motor graders, excavators, material haulers, and the like. The compactor 100 is adapted to move over a ground surface made of soil, asphalt, gravel, or any other surface, in order to compact it. The compactor 100 may be a manual, autonomous, or semi-autonomous machine, for example.

The compactor 100 includes a first frame 102, a second frame 104, an operator cab 106, wheels 108, and a compactor drum 110. The compactor drum 110 includes an outer surface that contacts the ground. An engine can be mounted on the compactor 100 for providing propulsion power. The engine may be an internal combustion engine such as a compression ignition diesel engine, or any other engine, including a gas turbine engine, for example. The operator cab 106 is mounted to the first frame 102. For manual or semi-autonomous machines, an operator of the compactor 100 can be seated within the operator cab 106 to perform one or more machine operations.

The second frame 104 may be connected to the first frame 102 such that the second frame 104 is able to articulate or pivot with respect to the first frame 102 to steer the compactor 100. The second frame 104 is configured to rotatably support the compactor drum 110, which moves along, and provides compaction for, the ground surface. The compactor drum 110 acts as a ground engaging member that rotates about a respective axis thereby propelling the compactor 100 on the ground surface along with the wheels 108. In other examples, the wheels 108 can be replaced with a second compactor drum that operates in a similar manner to the compactor drum 110.

The compactor 100 may include an obstacle detection system, for example, using one or more sensors or other devices configured to sense data for detection of obstacles around the compactor 100. For example, the compactor 100 may include two lidar assemblies 112*a* and 112*b* mounted to the first frame 102 and positioned to detect objects surrounding the compactor 100. Due to the field-of-view of the lidar assemblies 112*a* and 112*b*, two additional lidar assemblies may be needed to provide coverage for the area 114*a* when the frame 104 is articulated to steer the compactor 100 to the left (as illustrated by the arrow in FIG. 1), and a corresponding area when the second frame 104 is articulated to steer the compactor 100 to the right. For example, the position of the two lidar assemblies 112*a* and 112*b* on the first frame 102 can provide coverage for the front, rear and sides of the compactor 100, as illustrated by areas 114*b* and 114*c*. However, these two lidar assemblies 112*a* and 112*b* do not move with the articulated second frame 104, so the area 114*a* that is in a projected path of the compactor 100 during a left turn may not be detectable by the lidar assemblies 112*a* and 112*b*. Adding additional lidar assemblies to detect objects in the area 114*a* may be costly.

The obstacle detection system may also include a radar sensor 115. The radar sensor 115 may be mounted to the second frame 104 to provide further data regarding obstacles in front of the frame 104 of the compactor 100. For example, the radar sensor 115 may be able to provide coverage in front of the frame 104, as illustrated by area 114d. However, similar to the lidar assemblies 112a and 112b, the radar sensor 115 is unable to detect objects in the area 114a during a left turn.

To detect objects within the area 114a (and a corresponding area when the second frame 104 is articulated to turn the compactor 100 to the right), ultrasonic sensors 116a and 116b may be positioned on the front of the second frame 104. For example, due to the range provided by ultrasonic sensors, it may be desirable to position the ultrasonic sensors 116a and 116b) on opposite ends of a front bumper of the second frame 104, in front of the compactor drum 110. The placement of the ultrasonic sensors 116a and 116b on the right- and left-hand side of the front bumper of the second frame 104 provides steering coverage for the area 114a, eliminating the need for two additional lidar assemblies, providing a significant cost savings.

The compactor 100 may include a control and memory circuit 118 used to receive data from the lidar assemblies 112a and 112b, the radar sensor 115, the ultrasonic sensors 116a and 116b, and/or other sensors of an obstacle detection system. The control and memory circuit 118 can include, for example, software, hardware, and combinations of hardware and software configured to execute several functions related to, among others, obstacle detection for the compactor 100. The control and memory circuit 118 can be an analog, digital, or combination analog and digital controller including a number of components. As examples, the control and memory circuit 118 can include integrated circuit boards or ICB(s), printed circuit boards PCB(s), processor(s), data storage devices, switches, relays, or any other components. Examples of processors can include any one or more of a microprocessor, a controller, a digital signal processor (DSP), an application specific integrated circuit (ASIC), a field-programmable gate array (FPGA), or equivalent discrete or integrated logic circuitry.

The control and memory circuit 118 may include storage media to store and/or retrieve data or other information such as, for example, input data from the lidar assemblies 112a and 112b and the ultrasonic sensors 116a and 116b. Storage devices, in some examples, are described as a computer-readable storage medium. The data storage devices can be used to store program instructions for execution by processor(s) of control and memory circuit 118, for example. The storage devices, for example, are used by software, applications, algorithms, as examples, running on and/or executed by control and memory circuit 118. The storage devices can include short-term and/or long-term memory and can be volatile and/or non-volatile. Examples of non-volatile storage elements include magnetic hard discs, optical discs, floppy discs, flash memories, or forms of electrically programmable memories (EPROM) or electrically erasable and programmable (EEPROM) memories. Examples of volatile memories include random access memories (RAM), dynamic random-access memories (DRAM), static random-access memories (SRAM), and other forms of volatile memories known in the art.

While illustrated as positioned on the compactor 100, one or more control systems may be positioned remote from the compactors 100. For example, a remote computing system may be used by an operator to control the compactor 100 for a fully autonomous machine. In this example, the control and memory circuit 118 may communicate data to the remote computing device, or the lidar assemblies 112a and 112b and the ultrasonic sensors 116a and 116b may directly transmit data to the remote computing system.

Figure 2:
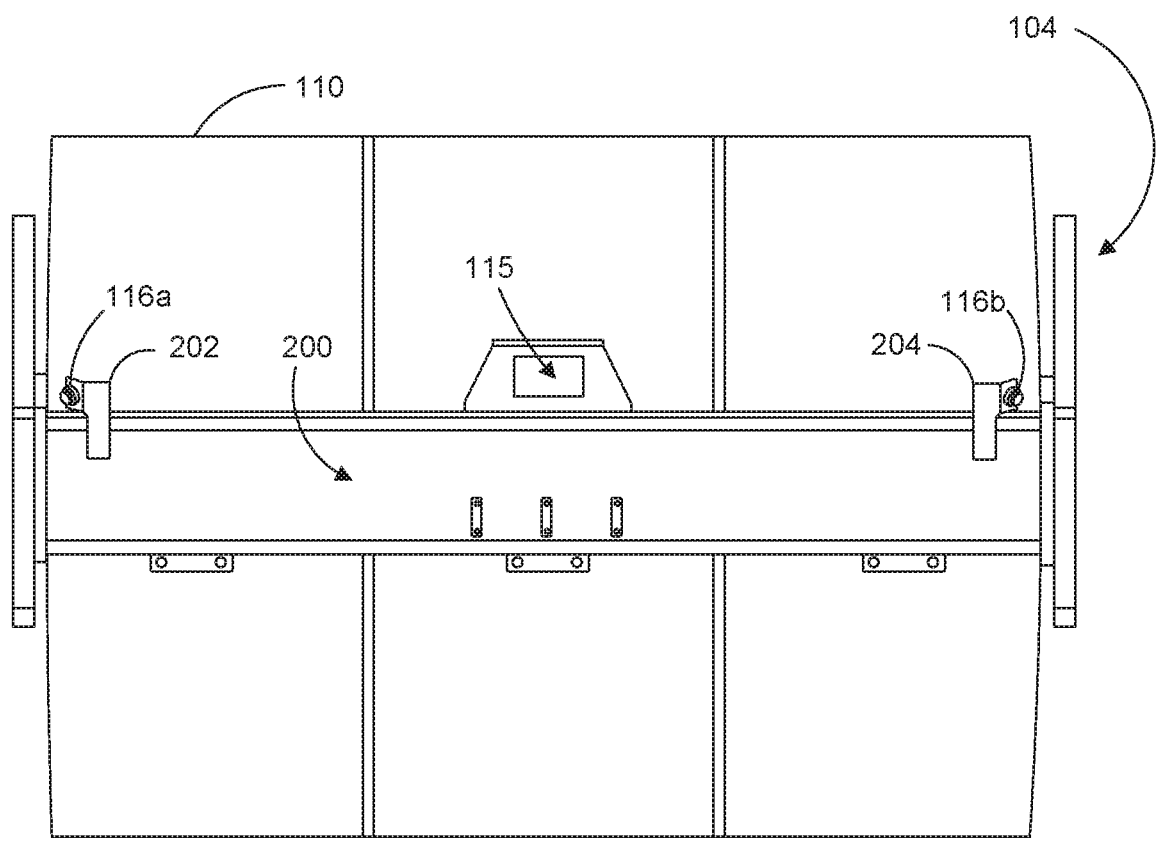
FIG. 2 is a front view of a portion of a work machine that includes ultrasonic sensors mounted to a front bumper of the work machine.

FIG. 2 is a front view of the second frame 104 of the compactor 100 that includes the ultrasonic sensors 116a and 116b mounted to a bumper 200 the second frame 104. The bumper 200 may be positioned on the forward-most portion of the frame 104. The ultrasonic sensors 116a and 116h are mounted to the bumper 200 using brackets 202 and 204 but may be positioned on the bumper 200 using any method of mounting or attachment. The radar sensor 115 may be mounted to the bumper 200 in the center of the bumper 200 to provide data regarding obstacles in front of the frame 104 of the compactor 100.

The ultrasonic sensor 116a is positioned on the left side of the bumper 200, left of center with respect to the frame 102 and the ultrasonic sensor 116b is positioned on the right side of the bumper 200, right of center with respect to the frame 102. In some examples, the ultrasonic sensors 116a and 116b may mounted or otherwise attached at any position on the bumper 200. In an example, the ultrasonic sensors 116a and 116b are positioned as close to the edges of the bumper 200 as possible to increase coverage during steering of the compactor 100.

Figure 3:
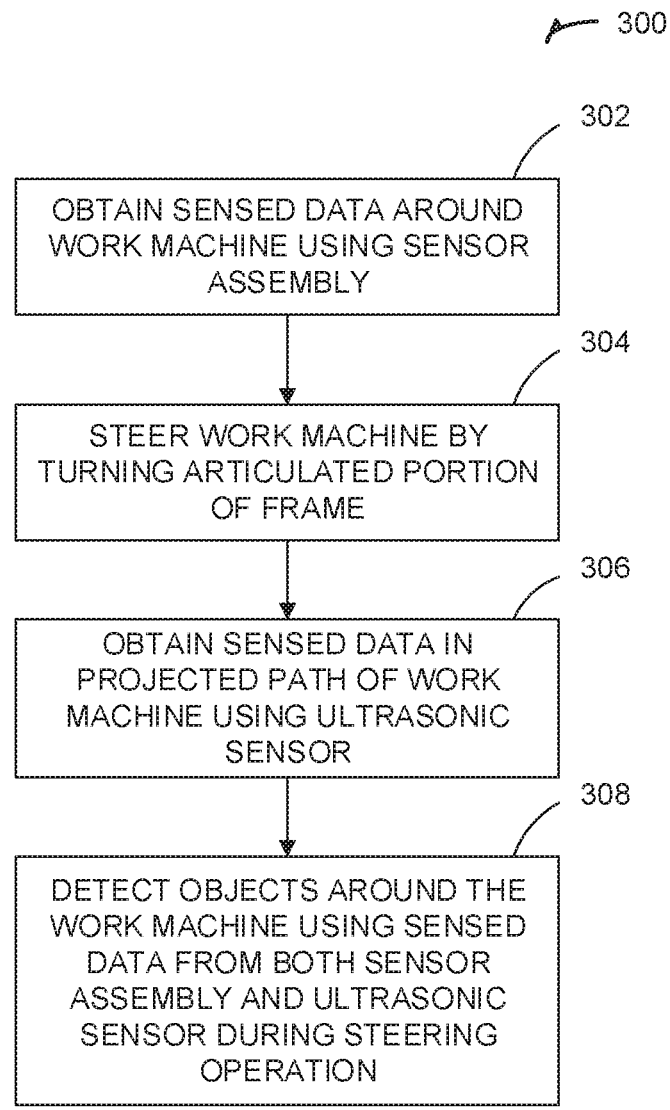
FIG. 3 is a flowchart illustrating a method for obstacle detection during steering of a work machine using ultrasonic sensors.

FIG. 3 is a flowchart illustrating a method 300 for providing obstacle detection using the ultrasonic sensors 116a and 116b. At step 302, an articulated-type soil compactor, such as the compactor 100, is traveling in a straight path such that the frame 102 is substantially in-line with respect to the frame 104. Lidar assemblies 112a and 112b, positioned on the frame 102, may be used to obtain data indicative of obstacles behind, in front of, and to the sides of the soil compactor. In an example, the lidar assemblies may be attached to a top surface of the back portion of the frame and able to sense data to detect obstacles within several feet of the compactor in each direction of the compactor when the compactor is travelling in a substantially straight direction. In another example, a radar sensor assembly, such as the radar sensor 115, may be used in addition to, or in place of the lidar assemblies 112a and 112b to sense data indicative of obstacles in front of the compactor 100.

At step 304, a steering operation begins for the compactor 100. To accomplish the steering operation, the frame 104 articulates with respect to the frame 102 to turn the compactor 100. Because of the articulation of the compactor 100, the lidar assemblies 112a and 112b on the frame 102 do not sense data within the projected path of the compactor 100. At step 306, to sense data within the projected path, ultrasonic sensors 116a and 116b are employed. The ultrasonic sensors 116a and 116b may be positioned on the bumper 200 of the frame 104 forward of the compactor drum 110. For example, the ultrasonic sensor 116a on the left portion of the bumper 200 may be used to sense data during a left turn of the compactor 100, and the ultrasonic sensor 116b on the right portion of the bumper 200 may be used to sense data during a. Right turn of the compactor 100. At step 308, during turning of the compactor 100, obstacles are detected using both the lidar assemblies 112a and 112b and the respective ultrasonic sensor. Obstacles in the projected path may be detected using the ultrasonic sensors 116a and 116b, and obstacles to the sides and rear of the compactor may be detected using the lidar assemblies 112a and 112b.

INDUSTRIAL APPLICABILITY

In one illustrative example, the work machine is an articulated-type automated soil compactor. The automated soil compactor includes an obstacle detection system configured to detect obstacles around the soil compactor during operation of the soil compactor. The obstacle detection system may include at least two lidar assemblies and two ultrasonic sensors. The lidar assemblies are positioned on a first frame portion of the soil compactor and configured to sense data for detection of obstacles around the soil compactor. When a second portion of the frame turns with respect to the first portion to steer the soil compactor, the lidar assemblies sense insufficient data in the projected path of the compactor.

To sense data in the projected path, the ultrasonic sensors are used. One ultrasonic sensor is positioned on the second portion of the frame to sense data for detection of obstacles during a left turn of the compactor, and one ultrasonic sensor is positioned on the second portion of the frame to sense data for detection of obstacles during a right turn of the compactor. By using ultrasonic sensors, obstacle detection coverage during steering of the soil compactor can be accomplished without the need for additional lidar assemblies. Ultrasonic sensors are significantly cheaper than lidar assemblies and thus, by using ultrasonic sensors for steering coverage, the overall cost of the obstacle detection system is greatly reduced.

The above detailed description is intended to be illustrative, and not restrictive. The scope of the disclosure should, therefore, be determined with references to the appended claims, along with the full scope of equivalents to which such claims are entitled.

What is claimed is:

1. A work machine comprising:
    a frame comprising:
        a first portion; and
        a second portion comprising a front bumper and configured to pivot with respect to the first portion for steering the work machine;
    a first sensor assembly positioned on the work machine and configured to sense data for detection of obstacles within a first area around the work machine; and
    an ultrasonic sensor positioned on the front bumper of the second portion and configured to sense data for detection of obstacles within a second area around the work machine, the second area outside the first area when the second portion is in an articulated position with respect to the first portion.

2. The work machine of claim 1, wherein the first sensor assembly is a first lidar sensor assembly positioned on the first portion of the frame, and wherein the ultrasonic sensor is a first ultrasonic sensor, and wherein the articulated position is a first articulated position, and wherein the work machine further comprises a second lidar sensor assembly positioned on the first portion of the frame and configured to sense data for detection of obstacles within a third area around the work machine.

3. The work machine of claim 2, further comprising a second ultrasonic sensor positioned on the front bumper of the second portion and configured to sense data for detection of obstacles within a fourth area around the work machine, the fourth area outside the third area when the second portion is in a second articulated position with respect to the first portion.

4. The work machine of claim 3, wherein the first articulated position is a position such that the second portion is turned to the left with respect to the first portion to steer the work machine to the left, and wherein the second articulated position is a position such that the second portion is turned to the right with respect to the first portion to steer the work machine to the right.

5. The work machine of claim 3, wherein the first ultrasonic sensor is positioned left of center of the front bumper with respect to the first portion of the frame and the second ultrasonic sensor is positioned right of center of the front bumper with respect to the first portion of the frame opposite the first ultrasonic sensor.

6. The work machine of claim 1, wherein the work machine is a soil compactor, and wherein the second frame portion is configured to support a compactor drum.

7. The work machine of claim 1, wherein the first sensor assembly is a radar sensor assembly positioned on the second portion of the frame and configured to sense data to detect obstacles in an area forward of the front bumper.

8. A method for detecting obstacles during operation of a work machine, the method comprising:
    sensing, using a first sensor assembly positioned on the work machine, data for detection of obstacles within a first area around the work machine;
    steering the work machine in a first direction by pivoting a second portion of a frame of the work machine with respect to a first portion of the frame of the work machine; and
    sensing, using an ultrasonic sensor positioned on a front bumper of the second portion of the frame, data for detection of obstacles within a second area around the work machine, the second area outside the first area when the second portion is in an articulated position with respect to the first portion.

9. The method of claim 8, wherein the first sensor assembly is a first lidar sensor assembly positioned on the first portion of the frame, and wherein the ultrasonic sensor is a first ultrasonic sensor, and wherein the articulated position is a first articulated position, and wherein the method further comprises:
    sensing, using a second lidar sensor assembly positioned on the first portion of the frame, data for detection of obstacles within a third area around the work machine.

10. The method of claim 9, further comprising:
    steering the work machine in a second direction opposite the first direction by pivoting the second portion of the frame with respect to the first portion; and
    sensing, using a second ultrasonic sensor positioned on the front bumper of the second portion, data for detection of obstacles within a fourth area around the work machine, the fourth area outside the third area when the second portion is in a second articulated position with respect to the first portion.

11. The method of claim 10, wherein the first ultrasonic sensor is positioned left of center of the front bumper with respect to the first portion of the frame and the second ultrasonic sensor is positioned right of center of the front bumper with respect to the first portion of the frame opposite the first ultrasonic sensor.

12. The method of claim 8, wherein the first sensor assembly is a radar sensor assembly positioned on the second portion of the frame, and wherein the ultrasonic sensor is a first ultrasonic sensor, and wherein the articulated position is a first articulated position, and wherein the method further comprises:
    sensing, using a second ultrasonic sensor positioned on the front bumper of the second portion, data for detection of obstacles within a third area around the work machine, the third area outside the first area when the second portion is in a second articulated position with respect to the first portion.

13. The method of claim 12, wherein the radar sensor assembly is positioned between the first and the second ultrasonic sensors.

14. The method of claim 8, wherein the work machine is a soil compactor, and wherein the second frame portion is configured to support a compaction drum.

15. A compactor comprising:
a first frame portion;
a second frame portion comprising a front bumper and configured to articulate with respect to the first portion for steering the compactor;
a sensor assembly positioned on the first frame portion or the second frame portion and configured to sense data for detection of obstacles within a first area around the compactor; and
an ultrasonic sensor positioned on the front bumper of the second frame portion and configured to sense data for detection of obstacles within a second area around the compactor, the second area outside the first area when the second frame portion is in an articulated position with respect to the first frame portion.

16. The compactor of claim 15, wherein the ultrasonic sensor is a first ultrasonic sensor, and wherein the articulated position is a first articulated position, and wherein the sensor assembly is a first lidar sensor assembly positioned on the first frame portion, and wherein the compactor further comprises a second lidar sensor assembly positioned on the first frame portion and configured to sense data for detection of obstacles within a third area around the compactor.

17. The compactor of claim 16, further comprising a second ultrasonic sensor positioned on the front bumper of the second frame portion and configured to sense data for detection of obstacles within a fourth area around the compactor, the fourth area outside the third area when the second frame portion is in a second articulated position with respect to the first frame portion.

18. The compactor of claim 17, wherein the first articulated position is a position such that the second frame portion is turned to the left with respect to the first frame portion to steer the compactor to the left, and wherein the second articulated position is a position such that the second frame portion is turned to the right with respect to the first frame portion to steer the compactor to the right.

19. The compactor of claim 17, wherein the first ultrasonic sensor is positioned left of center of the front bumper with respect to the first portion of the frame and the second ultrasonic sensor is positioned right of center of the front bumper with respect to the first frame portion opposite the first ultrasonic sensor.

20. The compactor of claim 15, wherein the sensor assembly is a radar sensor assembly positioned on the second frame portion and configured to sense data to detect obstacles in an area forward of the front bumper.

* * * * *